United States Patent
Chang et al.

(10) Patent No.: US 8,513,976 B2
(45) Date of Patent: Aug. 20, 2013

(54) SINGLE-ENDED SIGNALING WITH PARALLEL TRANSMIT AND RETURN CURRENT FLOW

(75) Inventors: Kun-Yung (Ken) Chang, Los Altos, CA (US); John W. Poulton, Chapel Hill, NC (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/497,340

(22) PCT Filed: Sep. 16, 2010

(86) PCT No.: PCT/US2010/049164
§ 371 (c)(1),
(2), (4) Date: Mar. 21, 2012

(87) PCT Pub. No.: WO2011/049693
PCT Pub. Date: Apr. 28, 2011

(65) Prior Publication Data
US 2012/0176156 A1   Jul. 12, 2012

Related U.S. Application Data

(60) Provisional application No. 61/253,445, filed on Oct. 20, 2009.

(51) Int. Cl.
*H03K 19/0175* (2006.01)
(52) U.S. Cl.
USPC ............................... 326/82; 326/26
(58) Field of Classification Search
None
See application file for complete search history.

(56) References Cited

U.S. PATENT DOCUMENTS

| | | |
|---|---|---|
| 6,072,366 A | 6/2000 | Maeda |
| 6,587,004 B2 | 7/2003 | Ide .................................. 330/308 |
| 6,597,229 B1 | 7/2003 | Koyata et al. .................. 327/333 |
| 6,985,009 B2 | 1/2006 | Nishio et al. ..................... 326/30 |
| 7,208,972 B2 * | 4/2007 | Dreps et al. ..................... 326/26 |
| 2004/0264267 A1 * | 12/2004 | Nishio et al. ................... 365/200 |
| 2006/0015275 A1 * | 1/2006 | Batra et al. ....................... 702/64 |
| 2006/0067713 A1 | 3/2006 | Farooqui et al. .............. 398/209 |
| 2006/0290432 A1 | 12/2006 | Chang et al. ................... 330/308 |
| 2007/0046389 A1 * | 3/2007 | Dreps et al. ....................... 333/1 |
| 2008/0175327 A1 * | 7/2008 | Truong et al. .................. 375/257 |

OTHER PUBLICATIONS

International Search Report and the Written Opinion dated May 4, 2011 re Int'l Application No. PCT/US2010/049164. 9 Pages.

* cited by examiner

*Primary Examiner* — Shawki Ismail
*Assistant Examiner* — Jany Richardson
(74) *Attorney, Agent, or Firm* — Charles Shemwell

(57) ABSTRACT

A single-ended signaling system in which transmitted and returned signal currents are enabled to flow substantially parallel to one another and thereby maintain a substantially uniform impedance along the length of a single-ended signal conductor. A reference plane is disposed substantially parallel to a single-ended signaling conductor and coupled to the signaling conductor within a signal-receiving IC and to signaling supply voltage nodes within a signal-transmitting IC. By this arrangement, an signal current flowing to or from the receiving IC via the signaling conductor is conducted to the reference plane, thereby enabling a signal-return current to flow back to or back from the transmitting IC along a single path that is substantially parallel to the signal conductor.

28 Claims, 7 Drawing Sheets

(Prior-Art)

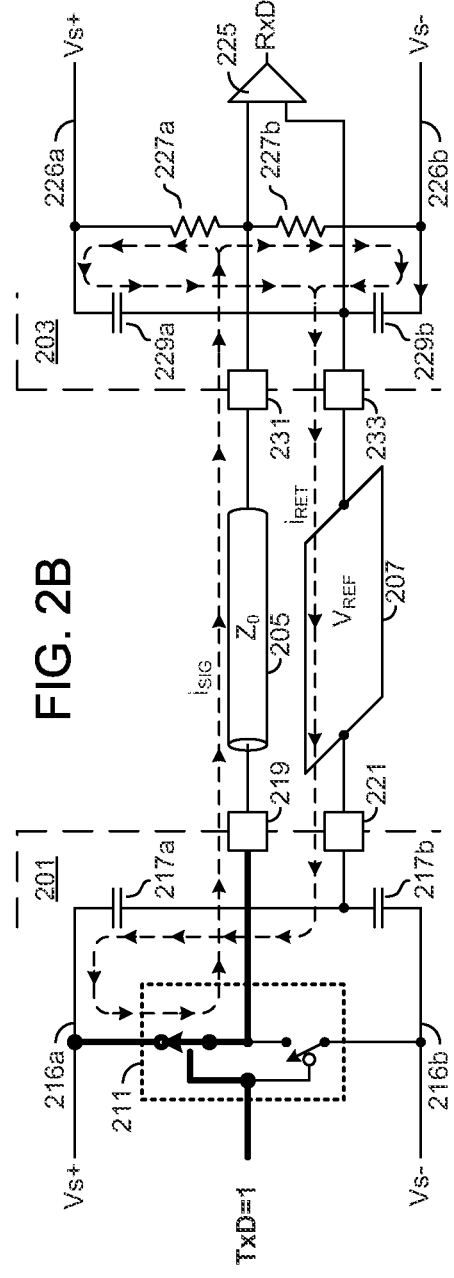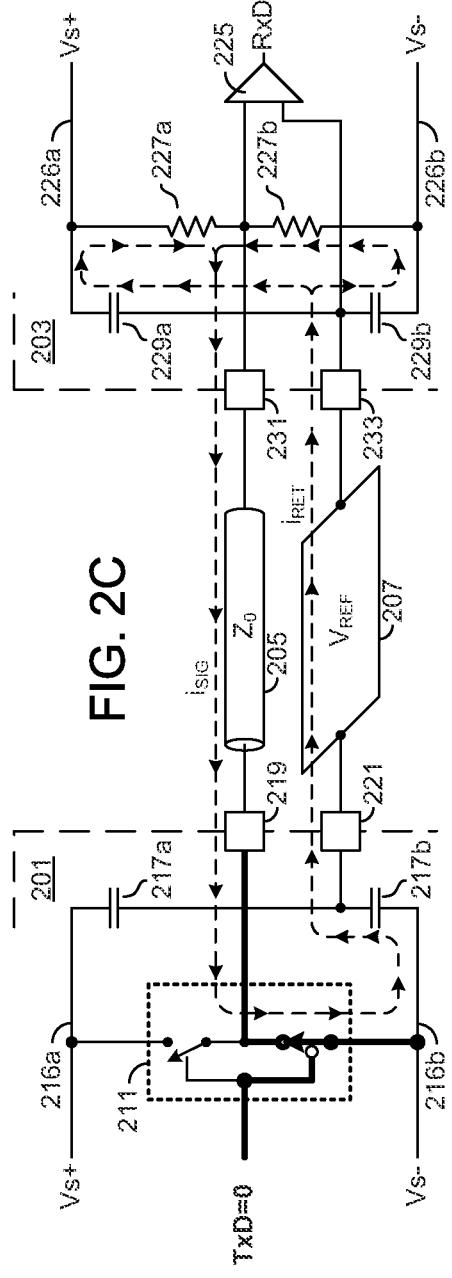

SINGLE-ENDED SIGNALING WITH PARALLEL TRANSMIT AND RETURN CURRENT FLOW

CROSS REFERENCE TO RELATED APPLICATIONS

Pursuant to 35 U.S.C. §§365 and 371, this application is a United States National Stage Application that claims priority to International Application No. PCT/US2010/049164 filed Sep. 16, 2010, which claims priority to U.S. Provisional Patent Application No. 61/253,445 filed Oct. 20, 2009. Each of the above-identified patent applications is hereby incorporated by reference in its entirety.

TECHNICAL FIELD

The present invention relates generally to the field of electronic communications and more particularly to signaling between integrated circuit devices.

BACKGROUND

Despite the performance gains available through differential signaling, the cost of two conductors per signal continues to impede its adoption in a number of chip-to-chip signaling applications, particularly those that require relatively wide data paths (e.g., between a memory controller and memory devices). Instead, single-ended signaling continues to prevail in such applications.

FIG. 1 illustrates a number of performance-limiting characteristics of a conventional single-ended signaling system. As shown, the system includes a signal-transmitting integrated circuit (IC) 101 and counterpart signal-receiving IC 103 coupled to one another via a single-ended signaling link 105 and powered by a DC power supply 104. The transmitting IC 101 includes an output driver 106 to modulate the potential on signal line 105 in accordance with a stream of transmit data bits (i.e., TxD, the data to be transmitted) and thus deliver a corresponding stream of symbols to the receiving IC 103. The receiving IC includes a signal receiver 115 to compare the signal line potential ($V_{SIG}$) with a reference voltage ($V_{REF}$) and to sample the comparison result at regular intervals, thereby recovering the data bit (i.e., logic '1' or '0') conveyed in each transmitted symbol.

With regard to performance limitations, if $V_{REF}$ is not centered between the logic '1' and logic '0' levels of the incoming signal (i.e., between $V_{HI}$ and $V_{LO}$), the minimum difference between $V_{REF}$ and $V_{SIG}$ is compressed, thus rendering the incoming signal more susceptible to noise-induced error (i.e., the signaling margin, or noise tolerance, is reduced). Such an error is illustrated in FIG. 1 by the noise-induced crossing of the $V_{REF}$ level shown at 112.

Another challenge presented within the single-ended signaling system is the data-dependent current draw from the power supply 104. That is, when a logic '1' is transmitted, a DC current is pulled through the impedance network (i.e., modeled by transmit-side pull-up impedance, $Z_T$, the signaling line impedance, $Z_0$, and receive-side pull-up impedance, $Z_R$) to discharge the signal line 105, while no such DC current is drawn during transmission of a logic '0' (thus permitting the signal line to charge toward $V_{DD}$). This data-dependent switching of the DC current through inductive components of the impedance network generates supply voltage noise that tends to couple asymmetrically with the transmitted signal and the reference voltage, thus further reducing signaling margin.

Yet another source of noise results from the non-uniform impedance presented by the signal return current. That is, in contrast to a differential signaling approach in which the signal current flowing on a given conductor is typically matched by a reverse flow on a parallel, counterpart conductor, the signal return current in single-ended system 100 is split between the ground and VDD rails, 109 and 107. More specifically, as shown by the AC current-flow diagram at 122, the signal return current, $i_{RET}$, is typically forced to flow through external and internal bypass capacitors (111 and 113, respectively) in order to return from ground rail 109 to $V_{DD}$ rail 107 and thus may not easily be maintained parallel to the signal line 105. Consequently, a non-uniform impedance (i.e., one or more impedance discontinuities) is presented to a signal propagating on the signal line 105, thus producing reflections and transients that constitute yet another source of margin-reducing noise.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2B and 2C illustrate AC current flow for the current-sourcing and current sinking transmission states, respectively, within the signaling system of FIG. 2A;

DETAILED DESCRIPTION

Figure 1:
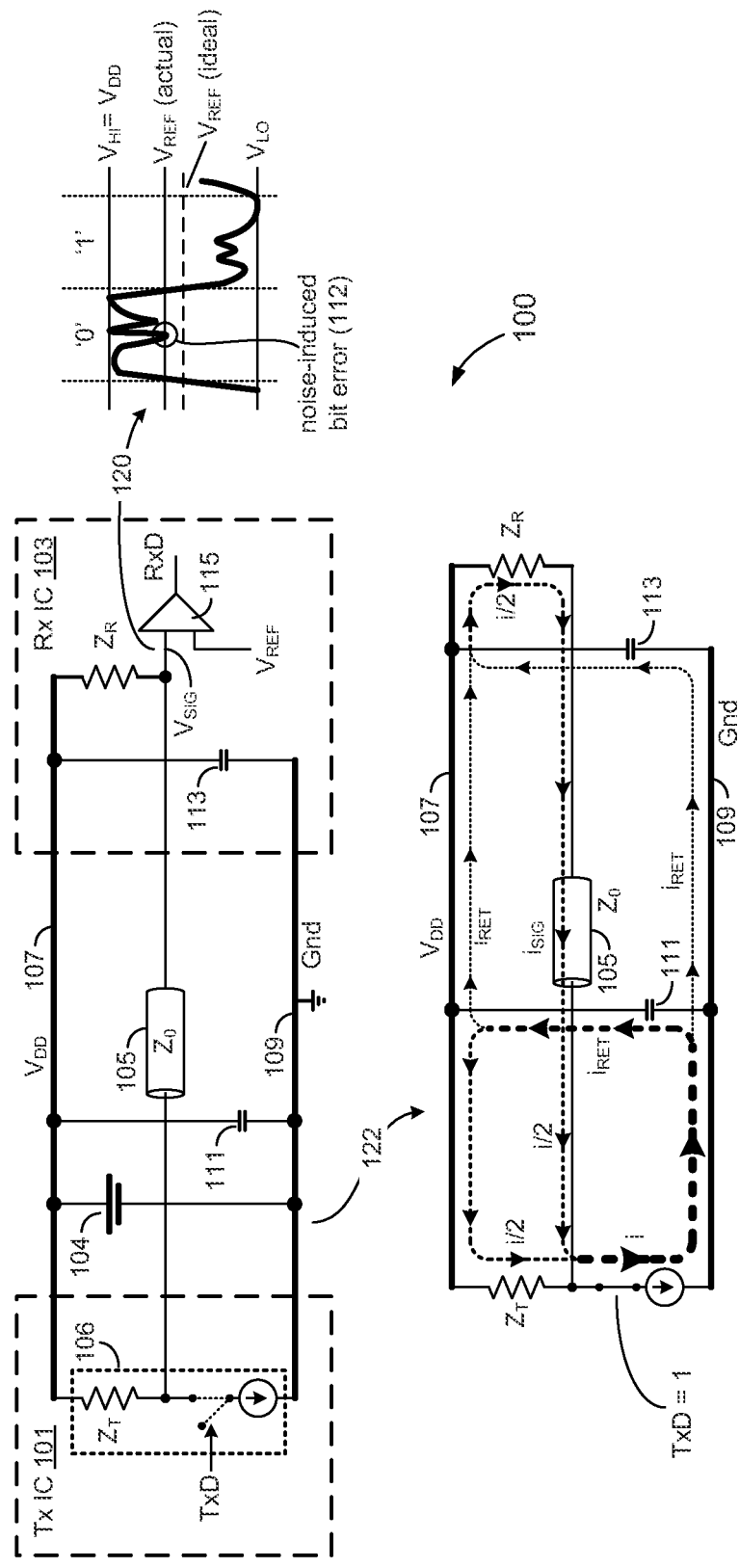
FIG. 1 illustrates performance-limiting characteristics of a conventional single-ended signaling system.

A single-ended signaling system in which transmitted and returned signal currents are enabled to flow substantially parallel to one another and thereby maintain a substantially uniform impedance along the length of a single-ended signal conductor is presented in various embodiments. In one embodiment, a reference plane is disposed substantially parallel to a single-ended signaling conductor and coupled to the signaling conductor within a signal-receiving IC and coupled to signaling supply voltage nodes within a signal-transmitting IC. By this arrangement, an AC current flowing to (or from) the receiving IC via the signaling conductor is conducted to the reference plane, thereby enabling a matching AC current to flow back to (or back from) the transmitting IC along a single path that is substantially parallel to the signal conductor.

In a more specific embodiment, the reference plane is coupled to a reference voltage input of a signal-receiving circuit within the receiving IC and thus provides a reference voltage that may be compared with the transmitted signal to recover the originally transmitted data sequence. In one such embodiment, the reference voltage is centered approximately between upper and lower supply voltages (e.g., $V_{DD}$ and ground) so that relatively low-noise voltage generation circuits may be employed to develop signal-transmission voltage supplies within the transmitting IC. The reference voltage may also be applied as a center-point about which upper and lower signal-transmission voltages are developed so that, regardless of the precise positioning of the reference potential relative to the system power supply voltages, the upper and lower signal transmission voltages may still be symmetrically centered about the reference voltage. Further, in one embodiment a push-pull signaling driver is provided within the transmitting IC to either source or sink a current on the single-ended signaling line and thus effect a symmetric signal swing about the reference voltage within the receiving IC. The push-pull signaling driver may also be designed to consume substantially the same power regardless of the data being transmitted (i.e., power consumed when drawing/sinking current from the signaling line is substantially the same as power consumed when sourcing/delivering current) thereby avoiding data-dependent power consumption and thereby potentially reducing switching noise. Thus, the various embodiments disclosed herein may enable improved signaling margin (and thus potentially higher bandwidth) over a single-ended signaling link by establishing data-independent power consumption and uniform impedance along the length of the signaling conductor, and by centering the voltage reference within the receiver-side signal swing without the need for complex calibration or reference voltage agreement schemes. In yet other embodiments, signal transmission and/or receive circuits may be run-time or production-time configurable to operate in one of multiple different signaling modes, thus enabling the host integrated-circuit to be applied in multiple different signaling environments.

Figure 2A:
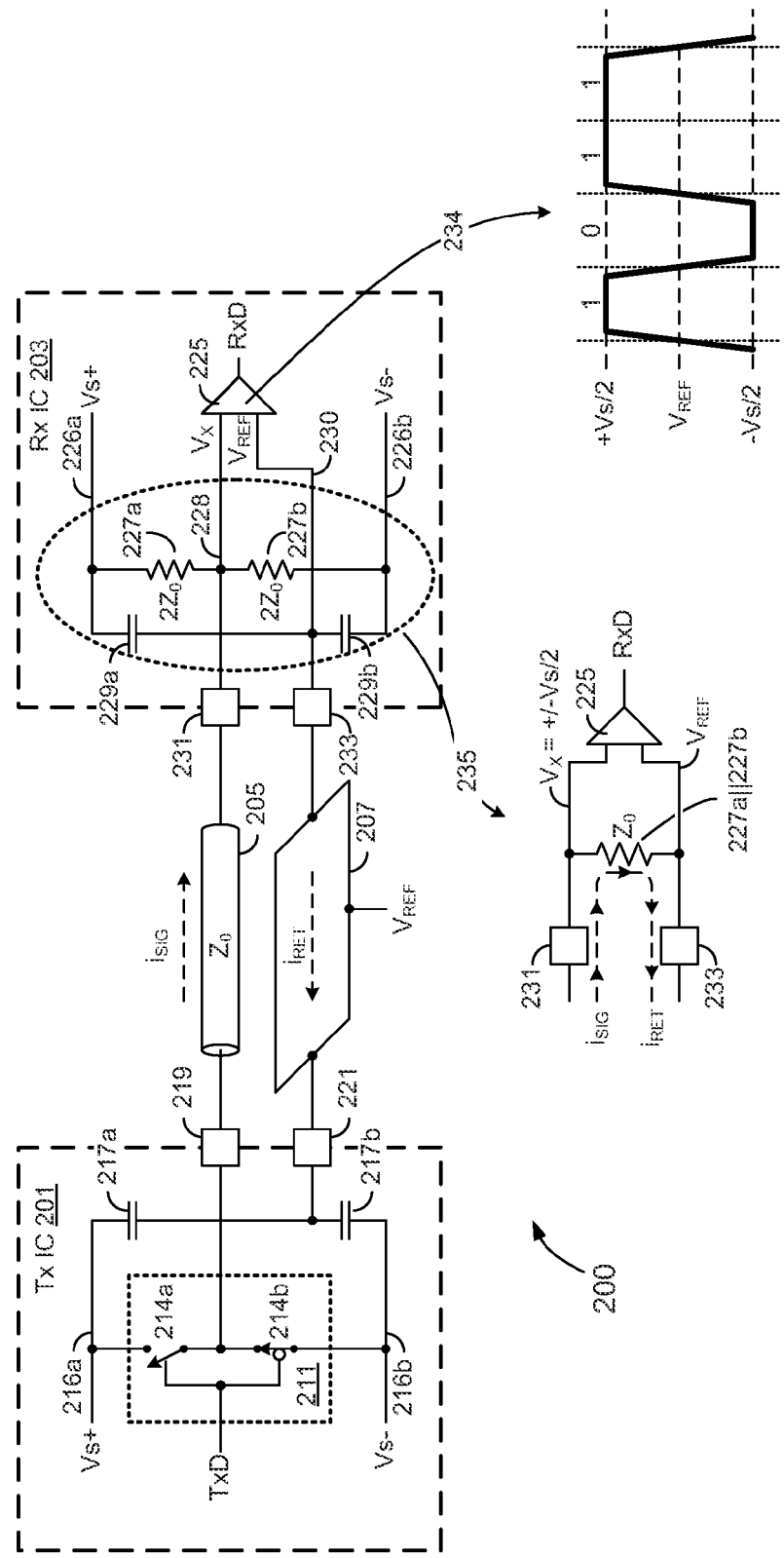
FIG. 2A illustrates an embodiment of a single-ended signaling system in which transmitted and returned signal currents flow substantially parallel to one another and thus establish a substantially uniform impedance along the length of a single-ended signal conductor.

FIG. 2A illustrates an embodiment of a single-ended signaling system 200 in which transmitted and returned signal currents, $i_{SIG}$ and $i_{RET}$, flow substantially parallel to one another and thus establish a substantially uniform impedance along the length of a single-ended signal conductor. System 200 is referred to herein as a "parallel-return-flow" signaling system and includes a transmitting integrated circuit (IC) device 201 and receiving IC device 203 coupled one another via a single-ended signaling conductor 205 (or signal line) and a reference plane 207. Though not specifically shown in FIG. 2A, the two ICs 201, 203 may also be coupled in common to upper and lower power supply rails (e.g., $V_{DD}$ and ground).

The transmitting IC 201 includes a push-pull output driver 211 coupled between upper and lower signaling supply voltage nodes 216a, 216b (also referred to herein as "signaling voltage supplies") and having an input to receive a stream of transmit data values (TxD) and an output coupled to the signal line 205 via interconnection pad 219 (or other interconnection structure). In the embodiment of FIG. 2A, the output driver itself is formed by a pair of switching elements 214a, 214b that are switched between complementary open and closed states in response to the transmit data stream. That is, switching element 214a is closed and switching element 214b opened in response to a logic '1' transmit data bit, and, conversely, switching element 214a is opened and switching element 214b closed in response to logic '0' transmit data bit, thus coupling the signal line to either the upper signaling supply voltage, Vs+ (216a), or the lower signaling supply voltage, Vs− (216b), according to whether a logic '1' or logic '0' data bit is to be transmitted, respectively. The response of the switching elements 214a, 214b to logic '1' and logic '0' transmit data bits may be reversed in an alternative embodiment. Also, though not specifically shown, the output driver 211 may additionally permit both switching elements to be driven to an open state thus present a high-impedance (i.e., tri-stated) output to the signal line 205.

Continuing with FIG. 2A, the receiving IC 203 includes a pair of load elements 227a, 227b coupled in series between respective signaling supply voltages 226a, 226b, again shown as Vs+ and Vs− though these "receiver-side" signaling supply voltages may be independently developed within the receiver IC 203 (and thus at different potentials than the transmit-side signaling supply voltages 216a, 216b). Node 228, the point of series connection between load elements 227a, 227b, is additionally coupled to a signal input of a receiver circuit 225 and to signal line 205 (i.e., via pad 231). By this arrangement, the load elements 227a, 227b establish a load impedance through which a signal current may flow in response to transmit-side coupling of the signal line to the Vs+ or Vs− signaling supply voltages (216a, 216b), thereby developing a signal voltage, $V_x$, at the signal input of the receiver circuit. In the particular embodiment shown, the receiver-side load elements 227a, 227b are each fixed or set to $2Z_0$, twice the impedance, Z0, of signal line 205 (different impedance ratios may be used in alternative embodiments). Consequently, when output driver 211 couples the upper signaling supply voltage, Vs+, to the signal output 219, current flows out of the transmitting IC 201 via the signal line to establish signaling current $i_{SIG}$ in the direction shown, and the resulting signal voltage at the input of receiver circuit 225 (i.e., node 228) is given by:

$$V_x = Vs - + (Vs + - Vs -)*[2Z_0/(Z_0|2Z_0 + 2Z_0)] = Vs - + \tfrac{3}{4}(Vs + - Vs -) \quad (1),$$

where '*' denotes multiplication and '|' denotes parallel impedances. Also, expression (1) assumes that the receiver-side and transmit-side signaling supply voltages are nominally the same (i.e., Vs+ nominally the same in both ICs, and Vs− nominally the same in both ICs), an assumption carried forward in a number of embodiments described herein, though not required.

When output driver 211 couples the lower signaling supply voltage, Vs−, to the signal output node 219, current flows into the transmitting IC 201 via the signal line (thus establishing signaling current $i_{SIG}$ in a direction opposite that shown in FIG. 2A) and the resulting signal voltage at the input of receiver circuit 225 is given by:

$$V_x = Vs - + (Vs + - Vs -)*[Z_0|2Z_0(Z_0 2Z_0 + 2Z_0)] = Vs - + \tfrac{1}{4}(Vs + - Vs -) \quad (2).$$

Accordingly, the net signal swing between logic low and logic high transmit data values is given by the difference between expressions (1) and (2) or:

$$V_{swing} = Vs - + \tfrac{3}{4}(VS + Vs -) - Vs - + \tfrac{1}{4}(Vs + - Vs -) = \tfrac{1}{2}(Vs + Vs -) \quad (3).$$

Still referring to FIG. 2A, the receiver circuit 225 additionally receives a reference voltage (i.e., at a reference voltage input coupled to reference plane 207 via reference voltage input node 233) and includes circuitry to compare the reference and signal voltages ($V_{REF}$ and $V_x$) and to sample the comparison result during each of a sequence of signal reception intervals (e.g., timed by a receive timing signal such as a clock signal or strobe signal, not specifically shown). If the signal voltage, $V_x$, is determined to exceed the reference voltage, $V_{REF}$, a sample having a first logic state (e.g., a logic '1') is generated, and if the reference voltage is determined to exceed the signal voltage, a sample having a second logic state (e.g., a logic '0') is generated. Further, by generating the transmit-side and receive-side signaling supply voltages, Vs+ and Vs−, symmetrically above and below the reference voltage, such that upper signaling supply voltage Vs+ has a potential, Vs, above $V_{REF}$, and lower signaling supply voltage Vs− has a potential, Vs, below $V_{REF}$, the total receiver-side signal swing will have a magnitude, Vs, centered about $V_{REF}$. That is, $$V_{swing} = \frac{1}{2}(Vs+ - Vs-) = \frac{1}{2}(Vs+ (-Vs)) = Vs \quad (4).$$

Expressed as a differential relative to $V_{REF}$, the input signal swings between ±Vs/2 as shown at 234, swinging high to Vs/2 above $V_{REF}$ (i.e., +Vs/2) to represent a logic '1' and swinging low to Vs/2 below $V_{REF}$ to represent a logic '0'. Thus, considering the complete signaling path, the output driver 211 within transmitting IC 201 sinks and sources a signal current on single-ended signaling line 205 in accordance with a sequence of transmit data values and thereby conveys a corresponding sequence of symbols (indicated by the direction of the signal current flow) over the signal line to the receiving IC 203. Within receiving IC 203, a signal voltage ($V_x$) that swings symmetrically above and below a reference voltage ($V_{REF}$), is developed in response to the signal current (whose alternating flow direction corresponds to the symbol conveyed), thus enabling comparison of the signal and reference voltages to recover a sequence of received data values (or data samples), RxD, that correspond to the originally transmitted data values.

Still referring to FIG. 2A, the signaling supply voltage nodes within both the receiving and transmitting ICs (216a/216b, 226a/226b) are coupled to the reference voltage input (221, 233) to enable the AC (alternating-current) signal current flowing into or out of the receiving IC 203 to be returned to or from the transmitting IC 201 via the reference voltage plane 207. FIGS. 2B and 2C illustrate this complete-circuit, small-signal (or AC) current flow for the current-sourcing ("pulling the signal line high") and current sinking (pulling the signal line low) states of output driver 211, respectively. Referring to FIG. 2A, for example, the two receiver-side load elements 227a, 227b appear in parallel for purposes of small signal analysis (thus presenting the small-signal equivalence model shown at 235 of FIG. 2A in which '∥' denotes parallel elements) so that the incoming signal current is split substantially equally across the two termination load elements 227a, 227b. Capacitive elements 229a and 229b are coupled between the reference voltage input node 233 and respective upper and lower signaling supply voltages at nodes 226a and 226b, and thus conduct the signal current to the reference voltage input node 233, thereby enabling a signal-return current, $i_{RET}$, that corresponds to the signal current ($i_{SIG}$) to flow back to the transmitting IC 201 via the reference voltage plane 207 and the transmit-side reference voltage input 221. This same signal-current and signal-return current flow occurs for the TxD=0 case shown in FIG. 2C, but in the opposite direction.

Within the transmitting IC 201, the capacitive coupling of the signaling supply voltage nodes 216a, 216b to the reference voltage input node 221 enables the signal-return current to flow back to the current-sourcing or current-sinking signaling supply voltage. That is, in the signal-current sourcing state shown in FIG. 2B, the signal return current is conducted from the reference voltage input 221 (from whence it arrives via the $V_{REF}$ plane 207) to the transmit-side Vs+ supply node 216a via capacitive element 217a. In the signal-current sinking state shown in FIG. 2C, the signal-return current is conducted from the transmit-side Vs− supply node 216b to the reference voltage input 221 (thus to flow back to the receiving IC 203 via the $V_{REF}$ plane 207) via capacitive element 217b.

Reflecting on the overall nature of the single-ended signaling system illustrated in FIGS. 2A-2C, it can be seen that centering of the signaling supply voltages about the incoming reference voltage ($V_{REF}$) effectively centers the incoming signal swing about the reference voltage, thus avoiding the need for complex calibration circuitry or other transmitter/receiver reference voltage agreement. Second, the power consumed by the transmit-side push-pull output driver (i.e., signal driver circuit that alternately sources or sinks a signaling current to convey an information-bearing signal) is substantially independent of the data sequence being transmitted, thus potentially lowering switching noise within the signaling system 200 (thereby increasing signaling margin), particularly where Vs+ and Vs− are powered by a common power supply as in embodiments discussed below. Further, the signal current and a corresponding signal-return current are enabled to flow uniformly across substantially parallel paths (i.e., signal line 205 and $V_{REF}$ plane 207) between the transmitting and receiving ICs, thereby maintaining a substantially uniform impedance along the length of the single-ended signal conductor 205 and thus avoiding impedance discontinuities (and the resulting noise) that plague prior-art approaches.

Figure 3:
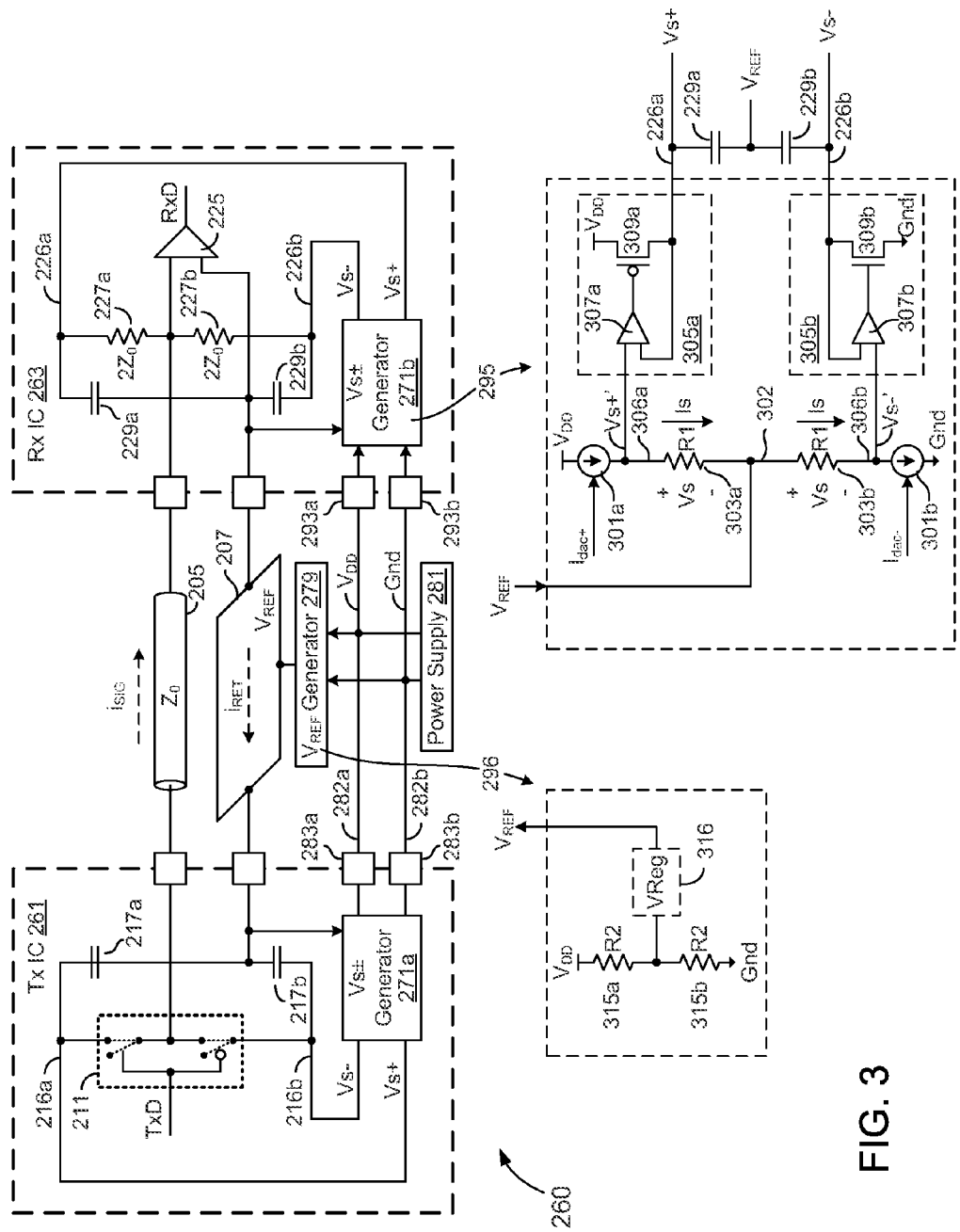
FIG. 3 illustrates a more detailed embodiment of a parallel-return-flow signaling system having an exemplary an off-chip reference voltage generator and power supply, as well as on-chip signaling supply voltage generators.

FIG. 3 illustrates a more detailed embodiment of a parallel-return-flow signaling system 260 including elements described above and additionally having an exemplary an off-chip reference voltage generator 279 and power supply 281, as well as on-chip signaling supply voltage generators 271a, 271b within transmitting and receiving ICs 261 and 263.

In the embodiment shown, referred to herein as a "rail-centered" embodiment, the reference voltage, $V_{REF}$, is developed approximately at the midpoint between upper and lower power supply voltages. That is, the reference voltage is centered between the supply voltage rails 282a, 282b, which are assumed for purposes of explanation to be at $V_{DD}$ and ground (though other supply voltages may be used in the embodiment shown or any of the other embodiments disclosed herein). Also, the upper and lower signaling supply voltages, Vs+ and Vs−, are generated at respective positive and negative 'Vs' offsets from the reference voltage, where Vs is less than ($V_{DD}$−Gnd)/2 so that both signaling supply voltages are within the power supply voltage range (i.e., Vs+ is less than $V_{DD}$ and Vs− is above the ground voltage). By centering the reference voltage (and bounding the signaling supply voltages, Vs+ and Vs−) between the upper and lower power supply voltages in this manner, generation of any signaling related voltages above VDD or below ground is obviated, simplifying design of the signaling supply voltage generator and making it possible to employ relatively low-noise voltage regulation circuitry to maintain the desired signaling supply voltages. Despite these advantages, any practicable combination of reference and signaling supply voltages may be generated and employed in alternative embodiments. For example, the upper or lower power supply voltages (e.g., $V_{DD}$ or ground, which may be provided to both ICs 261 and 263 via a conductive plane or other extensive conductive layer disposed in a printed circuit board or packaging substrate) may alternatively be used as the reference voltage. Also, as in the embodiment of FIG. 2A, the ratio and/or values of termination impedances 227a, 227b may be changed as necessary to establish a desired receiver-side termination, particularly in cases where $V_{REF}$ is not centered between upper and lower power supply voltages.

Continuing with the rail-centered embodiment of FIG. 3, because both signaling supply voltages, Vs+ and Vs−, are within the power supply voltage range, relatively low-noise voltage regulation circuitry may be used to implement the signaling supply voltage generators 271a and 271b. Referring to detail view 295 of signaling supply voltage generator 271b, for example, digitally-controlled current sources 301a and 301b (controlled by digital values Idac+ and Idac−, respectively) are provided to develop a current, Is, through a series-coupled pair of matching resistive elements 303a, 303b (i.e., each having resistance, 'R1'). The resistive elements are coupled in common to $V_{REF}$ at node 302, and the current sources 301a, 301b are balanced (e.g., through one-time or periodic calibration, or through closed loop operation to establish appropriate values of Idac+ and Idac−) so that negligible or no current flows to the $V_{REF}$ plane 207. By this arrangement, a voltage, Vs, is dropped across resistive element 303a and again across resistive element 303b so that an upper and lower reference nodes 306a and 306b (Vs+' and Vs−') are driven to voltages that are 'Vs' above and below $V_{REF}$, respectively, and thus to voltage levels symmetrically centered about $V_{REF}$. The reference nodes 306a, 306b are coupled to respective closed-loop voltage regulation circuits 305a, 305b, each formed by a differential amplifier (307a, 307b) and a current-conducting transistor (309a, 309b). The two closed-loop regulation circuits 305a, 305b operate in generally the same manner, with the differential amplifier 307a, 307b biasing the corresponding current-conducting transistor (309a, 309b) as necessary to maintain the regulator output (i.e., signaling supply voltage nodes 226a, 226b) at the potential provided on the corresponding reference node 306a, 306b. Thus, closed-loop regulation circuit 305a enables transistor 309a to source current via regulator output 226a as necessary to maintain a regulated voltage, Vs+, and closed-loop regulation circuit 305b enables transistor 309b to sink current via regulator output 226b as necessary to maintain a regulated voltage, Vs−. Capacitive elements 229a, 229b are shown at the output of the signaling supply generator to illustrate the capacitive coupling of the reference voltage input to the signaling supply voltage nodes 226a, 226b as shown in receiving IC 263 (capacitive elements 217a, 217b are coupled to the outputs of the signaling supply generator 271a in the same manner within transmit IC 261).

Still referring to FIG. 3, an exemplary implementation of reference voltage generator 279 is illustrated in detail view 296. In the embodiment shown, two matching resistive elements 315a and 315b (each having resistive value R2) are coupled in series between power supply rails 282a and 282b to form a resistor-divider that establishes $V_{REF}$ at the midpoint between $V_{DD}$ and ground. In one embodiment, the reference voltage conductor 207 is implemented by a low impedance planar conductor (e.g., a conductive layer within or on a surface of a multi-layer printed circuit board or within a multi-die integrated circuit package) and the resistive elements 315a, 315b have relatively low impedances (e.g., series coupled 500 ohm resistors mounted to or formed on/within a printed circuit board or packaging substrate) so that no voltage regulation circuitry is required to maintain a relatively stable voltage reference. In alternative embodiments, for example where imbalance between the current sources 301a and 301b is anticipated to produce an intolerably high leakage current into or out of the VREF plane, or where it is desirable to employ a higher-impedance reference voltage conductor (e.g., a trace or cable or other higher-impedance conductor than a planar conductive layer) or reference voltage generator, then a voltage regulator 316 may be provided to maintain the reference voltage potential at a steady-state. More generally, any circuitry for generating the reference voltage, including on-chip reference-voltage-generating circuitry within receiving IC 263 and/or transmitting IC 261, may be used in alternative embodiments.

Figure 4:
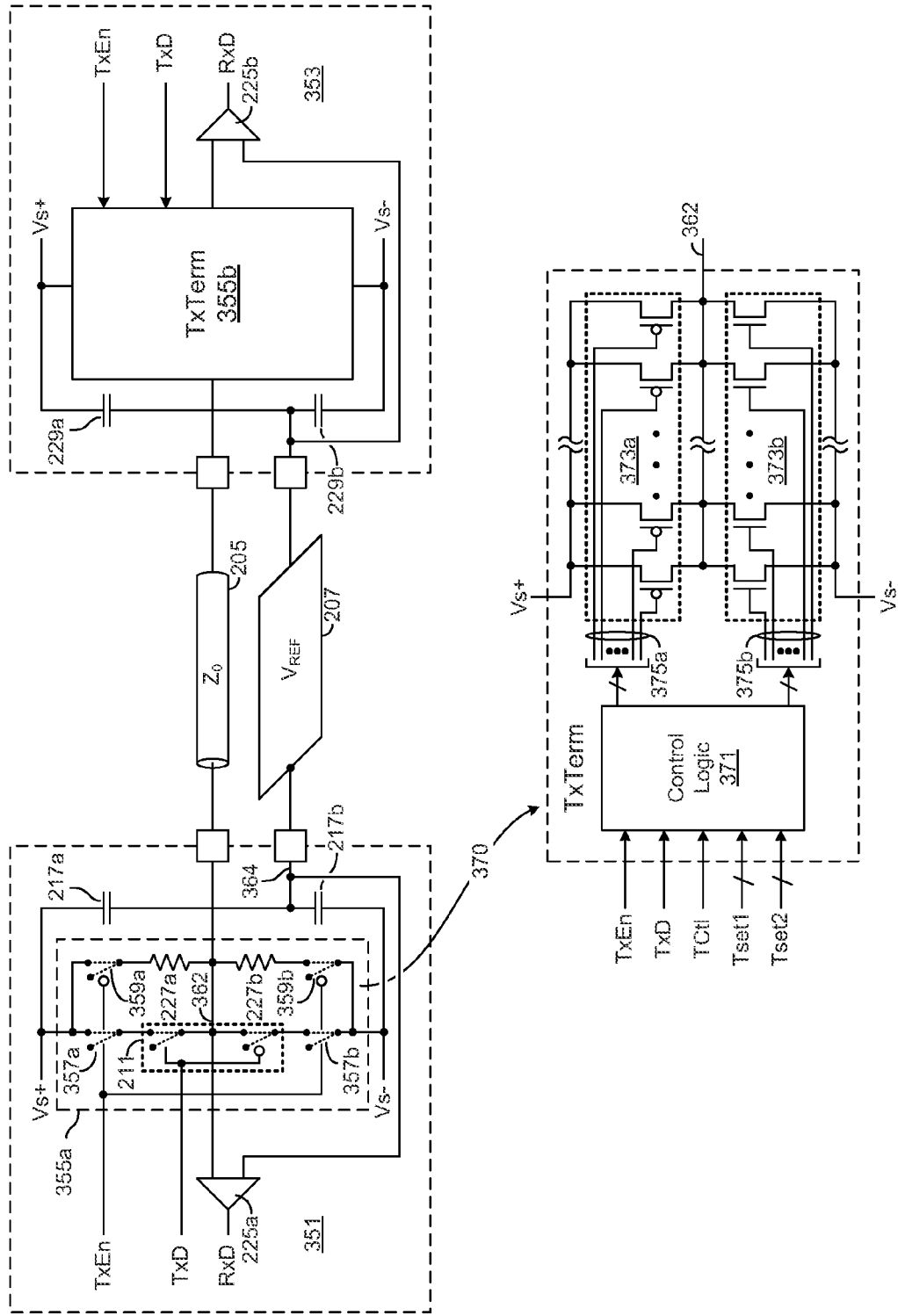
FIG. 4 illustrates an embodiment of a parallel-return-flow signaling system in which each of two signal-line-interconnected integrated circuit devices includes both signal transmission and signal reception circuitry to enable bidirectional chip-to-chip signaling.

FIG. 4 illustrates an embodiment of a parallel-return-flow signaling system in which each of two signal-line-interconnected ICs 351 and 353 includes both signal transmission and signal reception circuitry (i.e., transceiver circuitry) to enable bidirectional chip-to-chip signaling. Within each of the ICs 351 and 353, the transceiver circuit is formed by a receiver circuit 225a, 225b and a transmit/termination circuit 355a, 355b each powered by signaling supply voltages Vs+/Vs− that are referenced to a voltage reference, $V_{REF}$, as discussed above. The reference voltage input 364 (coupled to an external voltage reference plane 207 or other conductor) is also coupled to the upper and lower signaling supply voltage nodes (Vs+, Vs−) by capacitive elements 217a, 217b (within IC 351) and 229a, 229b (within IC 353) as described above.

In one embodiment, the receiver circuits 225a, 225b within the two ICs operate generally as described above to compare a signal voltage developed at signal input/output (I/O) node 362 with a reference voltage, and to sample the comparison result at regular intervals to generate a received data stream, RxD. The transmit/termination circuit performs the role of the push-pull output driver of FIG. 2A when a transmit-enable signal, TxEn, is asserted, and switches to a termination state when the transmit enable signal is deasserted. This is shown conceptually in the detail view of transmit/termination circuit 355a within IC 351 (transmit/termination circuit 355b within IC 353 may be identically implemented) by the imposition of transmit-enable switching elements 357a, 357b between the upper and lower signaling supply voltage nodes (respectively) and output driver 211, and by the imposition of termination-enable switching elements 359a, 359b between the upper and lower signaling supply voltage nodes (respectively) and termination impedances 227a, 227b. The transmit-enable switching elements 357a, 357b and termination-enable switching elements 359a, 359b are responsive to complementary states of the transmit-enable signal so that, when the transmit-enable signal is asserted (logic high in this example), the transmit-enable switches 357a, 357b are switched to a conducting state (closed) and the termination-enable switches 359a, 359b are switched to an open (i.e., substantially non-conducting) state, thereby placing the transceiver in a transmit mode by switchably coupling output driver 211 to the signaling supply voltages nodes and decoupling the termination impedances 227a, 227b from the signaling supply voltage nodes. Conversely, when the transmit-enable signal is deasserted, the transmit-enable switches are opened and the termination-enable switches closed, thus establishing a receive mode within the transceiver by switchably coupling the termination impedances 227a, 227b to the signaling supply voltage nodes and decoupling output driver 211 from the signaling supply voltage nodes.

In one embodiment, shown in detail view 370, transmit/termination circuitry 355a is implemented by a control logic circuit 371 and two banks of switching elements, 373a and 373b. In the particular embodiment shown, switch bank 373a is implemented by a set of P-MOS (P-type metal-oxide-semiconductor) transistors coupled in parallel between signal I/O node 362 and the upper signaling supply voltage, Vs+, while switch bank 373b is implemented by a counterpart set of N-MOS (N-type MOS) transistors coupled in parallel between signal I/O node 362 and the lower signaling supply voltage, Vs−. The gates of the P-MOS transistors and N-MOS transistors are controlled by respective enable signals asserted and deasserted on enable-signal lines 375a, 375b by the control logic circuit 371, thus enabling a desired combination of N-MOS and/or P-MOS transistors to be switched to a conducting state (or partially conducting state) and thus establish a desired transmit and/or termination state within the transmit/termination circuit. More specifically, the number of P-MOS transistors switched to a conducting state controls the effective load between the upper signaling supply voltage, Vs+, and signal I/O node 362, so that if a current-sourcing transmit state is required (i.e., TxEn=1, TxD=1), all the P-MOS transistors within switch bank 373a may be switched to a conducting state to effect a low or negligible impedance between the upper signaling supply voltage node and the signal I/O node, while all N-MOS transistors within switch bank 373b are concurrently switched to a non-conducting state to decouple the lower signaling supply voltage node from the signal I/O node. Conversely, if a current-sinking transmit state is required (TxEn=1, TxD=0), all the N-MOS transistors may be switched to a conducting state and all the P-MOS transistors may be switched to a non-conducting state. Further, if a receive mode is required (i.e., TxEn=0), a subset of the NMOS transistors within switch bank 373a may be switched to a conducting state (or to a partially conducting state) to establish a receive-mode termination impedance corresponding to impedance element 227, and a subset of the N-MOS transistors within switch bank 373b may likewise be switched to a conducting or partially conducting state to establish a receive-mode termination impedance corresponding to impedance element 227b. In one embodiment, the subset of N-MOS transistors and subset of P-MOS transistors switched on during receive mode is controlled by a termination setting "Tset" that may be programmed within a register of the host IC (i.e., the IC in which the transmit/termination circuit resides), and that may be changed dynamically according to the state of the signaling system to achieve stronger or weaker termination of the single-ended signaling line 205. In the particular embodiment shown, for example, a termination control signal, TCtl, is provided to the control logic to indicate whether a given transmission on the signaling line 205 is intended to be received by the host IC (TCtl=1) or to be received instead by another IC coupled to the signaling line (TCtl=0). When the intended recipient, a stronger termination setting (lower impedance) indicated by Tset1 may be applied, and when not the intended recipient, a weaker termination setting (higher impedance) indicated by Tset2 may be applied (the higher impedance to allow the signal to pass by without undue absorption of the signaling energy). More or fewer termination settings may be applied in alternative embodiments, with different or additional factors applied to determine the strength of the termination. The precise termination value to be applied under a given state of the signaling system may be established by selection of one of a fixed number of permissible enable-signal combinations, or through production-time or run-time testing (calibration). For example, one of a fixed number of termination settings may be determined during production-time or run-time (or preselected) and programmed within a register of the host IC by a control device such as a programmed-processor. Alternatively, a signal quality metric may be evaluated for different termination settings to enable identification and selection of termination setting(s) that yield a maximized (or near-maximized) value of the metric. Further, though the individual P-MOS transistors (and N-MOS transistors) within switch banks 373a and 373b are depicted as being identical, the transistors controlled by respective enable-signal lines 375a, 375b may be differently sized (e.g., having differently-sized footprints and/or formed by different numbers of ganged transistors having commonly coupled gates) to establish a set of weighted switching transistors. For example a set of N binary-weighted switching transistors (the smallest having unit size 'x', followed by transistors having sizes 2x, 4x, 8x, ..., $2^{N-1}$x) may be provided and controlled by respective enable-signals to enable selection of $2^N-1$ different impedance settings.

Still referring to FIG. 4, the transmit-enable signal, TxEn, may be asserted and deasserted by control logic within the host IC (not specifically shown) in response to self-generated state information and/or control signals received from an external source. For example, in one embodiment, IC 351 is a memory controller that includes control logic (or "core logic") to raise and lower the transmit-enable signal in response to memory access requests received from a host device, thereby enabling transmission of memory access commands and write data to IC 353 and receiving read data from IC 353. In such an embodiment, IC 353 may be any type of memory IC (e.g., a static random access memory (SRAM), dynamic RAM (DRAM), Flash memory, etc.) having control logic that responds to incoming commands (e.g., signaled over the single-ended signaling links) by raising and lowering a local transmit-enable signal to enable receipt of write data and transmission of read data.

Figure 5:
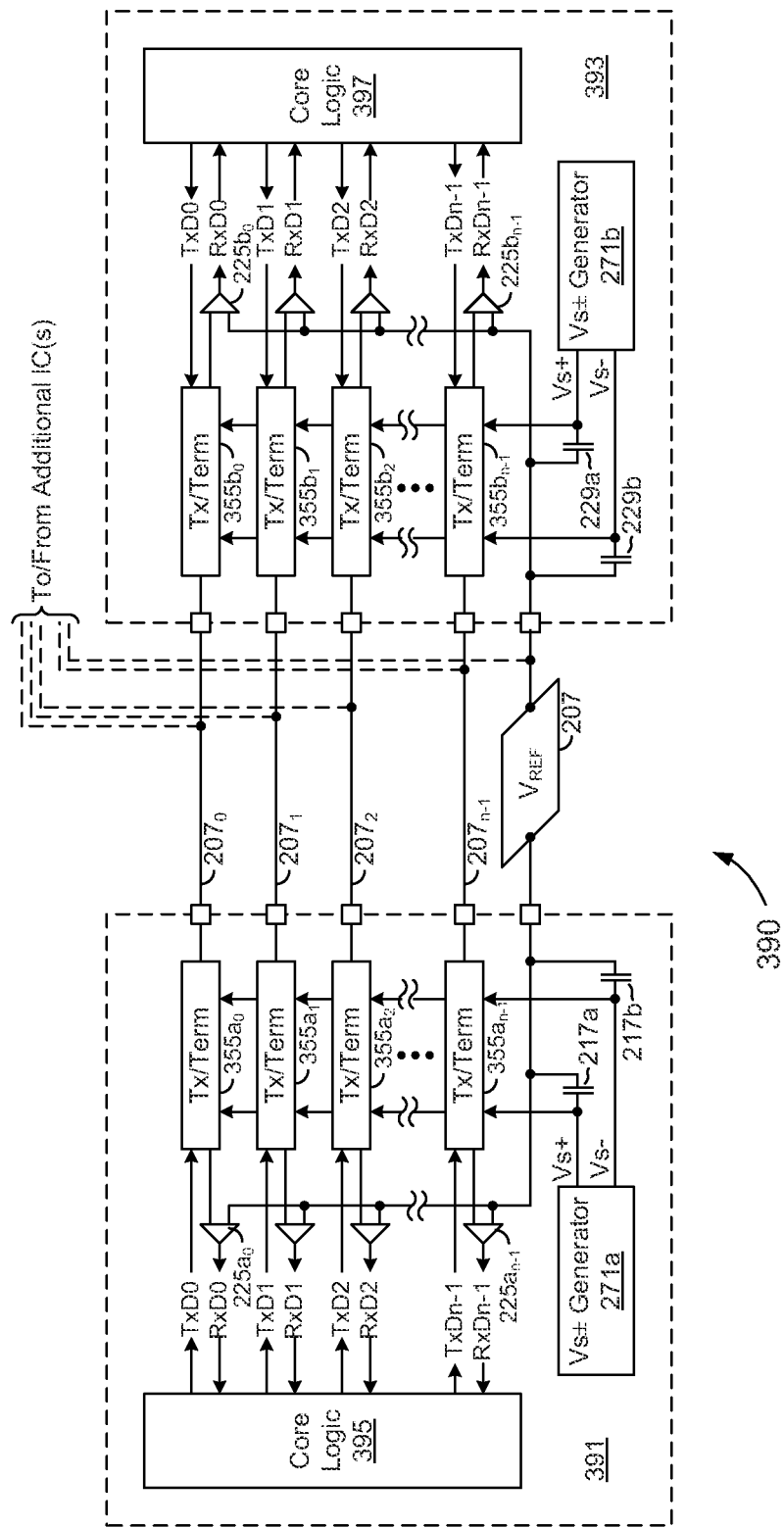
FIG. 5 illustrates a parallel-return-flow signaling system in which two or more integrated circuit devices are interconnected by a generalized number of single-ended signaling lines and at least one reference voltage conductor.

While parallel-return-flow signaling embodiments have thus far been described in the context of two ICs coupled to one another via a solitary single-ended signaling line, two or more ICs may be interconnected by any number of single-ended signaling lines, all or any subset of which may share a reference voltage conductor as a signal current-return path. FIG. 5 illustrates such a signaling system 390 in which two ICs 391 and 393 (and, optionally, any number of additional ICs) are interconnected by a generalized number (n) of single-ended signaling lines, $207_1$-$207_{n-1}$, and at least one reference voltage conductor 207 (depicted for example as a planar conductor). Within ICs 391 and 393, the signaling lines 2071-207n−1 are coupled to respective transceiver circuits implemented by a transmit/termination circuits ($355a_0$-$355a_{n-1}$ within IC 391 and $355b_0$-$355b_{n-1}$ within IC 393) and receiver circuits ($225a_0$-$225a_{n-1}$ within IC 391 and $225_{b0}$-$225b_{n-1}$ within IC 393), each of which operates generally as described in reference to FIG. 4. As shown, a signaling supply voltage generator 371a, 371b within each IC generates signaling supply voltages (Vs+, Vs−) on nodes that are coupled to the reference voltage input as described above (e.g., by capacitive elements 217a/217b within IC 391 and by capacitive elements 229a/229b within IC 393) and that are coupled in common to (and thus shared by) each of the transceivers. In alternative embodiments, one or more additional reference voltage planes 207 and/or signaling supply voltage generators (within either or both ICs 391 and 393) may be provided for respective subsets of single-ended signaling lines 207. Also, if one or more of the signaling lines is to be unidirectionally driven (i.e., bidirectional signaling not required), a transmitter and receiver may be provided with the transmitting and receiving ICs, respectively, instead of the transceivers shown. For example, in a memory system implementation in which IC 391 is a memory controller and IC 393 is a memory device (which may be one of multiple memory devices disposed on a printed circuit board such as a memory module substrate or printed circuit board, or disposed within a multi-die IC package), a subset of the single-ended signaling lines 207 may be deployed as memory command/request/control lines or address lines in which signals flow only from the memory controller to the memory device (i.e., unidirectionally), while others of the single-ended signal lines 207 may be bidirectional data lines to convey write data from the memory controller to the memory device, and read data from the memory device to the memory controller. In such an embodiment, the core logic 395 within IC 391 may include a command/request queue to queue memory access commands in response to requests from a host device (e.g., a processor or other memory-access requestor) and corresponding read and write data buffers to buffer data being routed from the host device to the memory IC 393 and vice-versa. By contrast, the core logic 397 within the memory IC 393 may include control circuitry for responding to incoming memory access commands (and maintenance commands) together with a core storage array to enable data storage and retrieval in response to signals issued by the control circuitry. The core logic within both or either of the ICs 391, 393 may additionally include run-time or production-time programmable registers to support various operating modes within the IC, including the above-described termination control settings. More generally, the core logic within the two ICs 391 and 393 may be dedicated to any function that involves chip-to-chip information exchange. Further, the single-ended signaling lines shown are not limited to conveyance of information-bearing signals, and instead may provide timing control as in the case of strobe or clock signals or otherwise perform any needed function. Also, while only single-ended signal lines are shown in system 390, any combination of such single-ended signal lines and differential lines may be provided in alternative embodiments.

Figure 6:
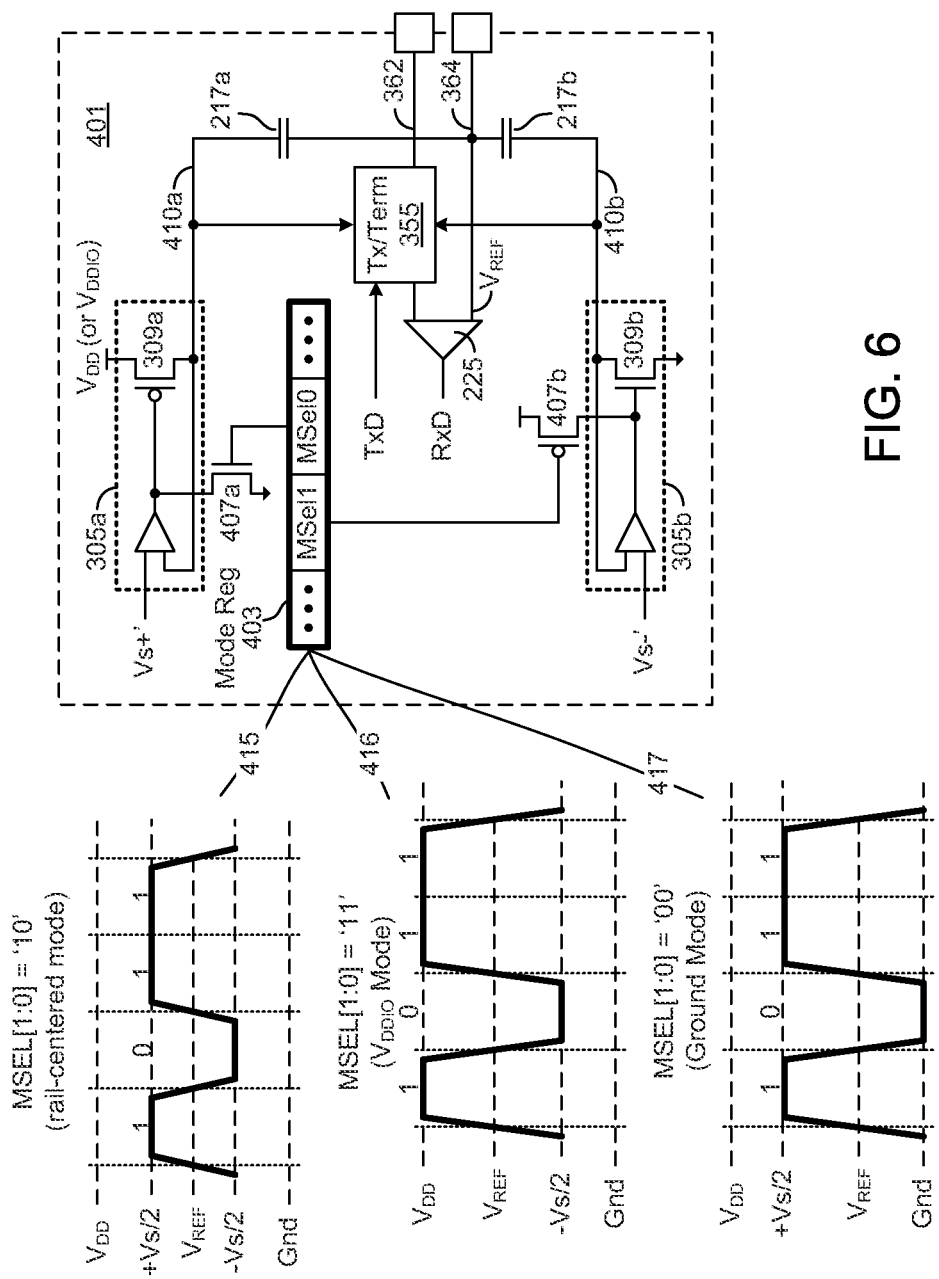
FIG. 6 illustrates an embodiment of a multi-mode transceiver that may be operated in any one of multiple register-enabled signaling modes.

Returning briefly to the embodiment of FIG. 3, another advantage of maintaining signaling supply voltages within the power supply voltage range, is that legacy signaling modes that involve signaling levels within the power supply voltage range may be more easily supported. FIG. 6, for example, illustrates an embodiment of a multi-mode transceiver 401 in which a mode register 403 of the host IC may be programmed to enable operation in either the rail-centered (push-pull) signaling mode described in reference to FIG. 3, or in a current-sourcing mode, referred to herein as $V_{DDIO}$ signaling mode, or in a current-sinking mode, referred to herein as a ground signaling mode. In the particular embodiment shown, the mode register 403 includes a pair of mode-select bits, MSel1 and MSel0, which are coupled respectively to the gates of regulator-bypass transistors 407a, 407b. Regulator-bypass transistor 407a is coupled between the gate of current-conducting transistor 309a (part of the closed-loop regulator 305a described in reference to FIG. 3) and ground, and regulator-bypass transistor 407b is coupled between the gate of current-conducting transistor 309b (part of closed-loop regulator 305b) and $V_{DD}$. By this arrangement, if either of the mode-select bits is in a state that switches the corresponding regulator-bypass transistor 407a or 407b to a conducting state (i.e., MSel0=1 or MSel1=0), the corresponding voltage regulator 305a or 305b is effectively disabled and the corresponding signaling supply voltage node 410a or 410b is switchably coupled (via current-conducting transistor 309a or 309b) to a power supply rail. That is, if MSel0 and MSel1 are both programmed to logic '1' values, the upper signaling supply voltage node 410a is coupled to $V_{DD}$ (or to a lower I/O voltage, $V_{DDIO}$) via the operation of bypass transistor 407a and current-conducting transistor 309a, thereby enabling a legacy $V_{DDIO}$ signaling mode in which the signal swings between $V_{DD}$ (or $V_{DDIO}$) and −Vs/2 as shown at 416. By contrast, if MSel0 and Msel1 are both programmed to logic '0' values, the lower signaling supply voltage node 410b is coupled to ground (or $V_{SS}$, or whatever potential is provided as the lower power supply voltage) to enable a legacy signaling mode (ground signaling mode) in which the signal swings between the lower power supply potential (ground in this example) and +Vs/2 as shown at 417. If MSel1 is programmed to '0' and MSel0 is programmed to '0', then both bypass transistors 407a, 407b are switched to a non-conducting state to enable the rail-centered, push-pull signaling mode shown at 415 and described above in reference to FIG. 3. In both $V_{DDIO}$ signaling mode and ground signaling mode, the reference voltage may be generated at a potential that corresponds to the approximate midpoint of the signal swing. Also, even in the legacy signaling modes, the capacitive coupling between the signaling supply voltage nodes 410a and 410b to reference voltage node 364 (i.e., via capacitive elements 217a and 217b, respectively) may be used to enable parallel-return-flow signaling, with the signal flowing in or out of the transceiver circuit via signal I/O node 362 being returned from or to the transceiver circuit via reference voltage input 364.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, the interconnection between circuit elements or blocks may be shown as buses or as single signal lines. Each of the buses may alternatively be a single signal line, and each of the single signal lines may alternatively be buses. Signals and signaling paths shown or described as being single-ended may also be differential, and vice-versa. A signal driving circuit is said to "output" a signal to a signal receiving circuit when the signal driving circuit asserts (or deasserts, if explicitly stated or indicated by context) the signal on a signal line coupled between the signal driving and signal receiving circuits. The expression "timing signal" is used herein to refer to a signal that controls the timing of one or more actions within an integrated circuit device and includes clock signals, strobe signals and the like. "Clock signal" is used herein to refer to a periodic timing signal used to coordinate actions between circuits on one or more integrated circuit devices. "Strobe signal" is used herein to refer to a timing signal that transitions to mark the presence of data at the input to a device or circuit being strobed and thus that may exhibit periodicity during a burst data transmission, but otherwise (except for transition away from a parked condition or other limited pre-amble or post-amble transition) remains in a steady-state in the absence of data transmission. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation within an integrated circuit device, the method comprising:
   receiving a first signal having a time-varying current via a signal input node;
   receiving a reference voltage via a reference voltage input node;
   comparing a time-varying voltage that corresponds to the time-varying current with the reference voltage to recover digital information indicated by the time-varying current; and
   conducting at least part of the time-varying current via the reference voltage input node.

2. The method of claim 1 further comprising conducting the time-varying current through a load to develop the time-varying voltage.

3. The method of claim 1 wherein conducting the time-varying current via the reference voltage input node comprises conducting the time-varying current from the signal input node to the reference voltage input node.

4. The method of claim 1 wherein receiving a reference voltage via a reference voltage input node comprises receiving a power supply voltage via the reference voltage input, and wherein comparing a time-varying voltage with the reference voltage comprises comparing a time-varying voltage that swings above and below the power-supply voltage with the power-supply voltage.

5. The method of claim 1 further comprising receiving upper and lower power supply voltages via respective supply voltage nodes, and wherein the reference voltage is above the lower power supply voltage and below the upper power supply voltage.

6. The method of claim 1 further comprising outputting a second signal having a time-varying current via the signal input node, the time-varying current of the second signal being representative of digital information to be conveyed to a device external to the integrated circuit device.

7. The method of claim 6 further comprising generating an upper signaling supply voltage that is above the reference voltage and a lower signaling supply voltage that is below the reference voltage, and wherein outputting a second signal having a time-varying current via the signal input node comprises switchably coupling either the upper signaling supply voltage or the lower signaling supply voltage to the signal input node according to the state of data values to be transmitted.

8. A method of operation within an integrated circuit device, the method comprising:
   receiving a reference voltage via a reference voltage input node;
   outputting a first signal having a time-varying current via a signal output node, the first signal having a voltage swing substantially centered about the reference voltage; and
   receiving a time-varying return current that corresponds to the time-varying current of the first signal via the reference voltage input node.

9. The method of claim 8 further comprising generating upper and lower signaling supply voltages that are substantially centered about the reference voltage.

10. The method of claim 9 wherein generating upper and lower signaling supply voltages comprises generating the upper signaling supply voltage on a first signaling supply node and generating the lower signaling supply voltage on a second signaling supply node, the method further comprising conducting at least part of the time-varying return current via the first and second signaling supply nodes.

11. The method of claim 10 wherein conducting at least part of the time-varying return current via the first and second signaling supply nodes comprises conducting the at least part of the time-varying return current via the first and second signaling supply nodes using a capacitive coupling.

12. The method of claim 9 further comprising receiving upper and lower power supply voltages via respective power supply inputs, and wherein generating upper and lower signaling supply voltages that are substantially centered about the reference voltage comprises generating an upper signaling supply voltage that is lower than the upper power supply voltage and generating a lower signaling supply voltage that is higher than the lower power supply voltage.

13. The method of claim 8 wherein outputting a first signal having a time-varying current comprises outputting a first signal in which a first current flows out of the integrated circuit device via the signal output node to represent a first state of a transmitted symbol and in which a second current flows into the integrated circuit device via the signal output node to represent a second state of a transmitted symbol, and wherein the first current and the second current have substantially equal magnitudes.

14. An integrated circuit device comprising
a signal input node to receive a first signal having a time-varying current;
a reference voltage input node to receive a reference voltage from an external source;
a signal receiving circuit to compare a time-varying voltage that corresponds to the time-varying current with the reference voltage to recover digital information indicated by the time-varying current; and
capacitive coupling between the signal input node and the reference voltage input node to conduct at least part of the time-varying current via the reference voltage input node.

15. The integrated circuit device of claim 14 further comprising a load through which the time-varying current is conducted to develop the time-varying voltage.

16. The integrated circuit device of claim 14 further comprising supply voltage inputs to receive upper and lower power supply voltages from an external power supply, and wherein the reference voltage is above the lower power supply voltage and below the upper power supply voltage.

17. The integrated circuit device of claim 14 further comprising a transmit circuit to output a second signal having a time-varying current via the signal input node, the time-varying current of the second signal being representative of digital information to be conveyed to a device external to the integrated circuit device.

18. The integrated circuit device of claim 17 further comprising a signaling supply voltage generator to generate an upper signaling supply voltage greater than the reference voltage of an upper signaling supply voltage node and a lower signaling supply voltage less than the reference voltage on a lower signaling supply voltage node, and wherein the transmit circuit includes a first switching element to couple the upper signaling supply voltage node to the signal input in response to a first state of a transmit data value and a second switching element to couple the lower signaling supply voltage node to the signal input in response to a second state of the transmit data value.

19. The integrated circuit device of claim 14 further comprising a storage array to store the digital information indicated by the time-varying current.

20. An integrated circuit device comprising:
an output driver to develop a first signal having a time-varying current using upper and lower signal supply voltages and to output the first signal from the integrated circuit device;
a reference voltage input node to receive a reference voltage from an external reference voltage source and to conduct a time-varying return current that corresponds to the time-varying current of the first signal, the reference voltage being lower than the upper signal supply voltage and higher than the lower signal supply voltage.

21. The integrated circuit device of claim 20 further comprising a capacitive coupling between the reference voltage input node and the output driver to conduct at least part of the time-varying return current.

22. The integrated circuit device of claim 20 further comprising a signaling supply voltage generator to generate the upper and lower signaling supply voltages that are substantially centered about the reference voltage.

23. The integrated circuit device of claim 22 wherein the output driver to output a first signal having a time-varying current from the integrated circuit device comprises:
a first switching element to couple a signal output node of the integrated circuit device to the upper signaling supply voltage in response to a first state of a transmit data value; and
a second switching element to couple the signal output node of the integrated circuit device to the lower signaling supply voltage in response to a second state of a transmit data value.

24. The integrated circuit device of claim 23 wherein the upper signaling supply voltage is coupled to the reference voltage input node via a first capacitive element, and the lower signaling supply voltage is coupled to the reference voltage input node via a second capacitive element.

25. The integrated circuit device of claim 20 further comprising a storage array, and wherein the a first signal having a time-varying current is indicative of information retrieved from the storage array.

26. A signaling system comprising:
a signal conductor;
a reference voltage conductor to convey a steady-state reference voltage;
a first integrated circuit having an output driver to enable a time-varying current to flow on the signal conductor in response to a sequence of transmit data values;
a second integrated circuit having a signal receiver coupled to the signal conductor and the reference voltage conductor and including circuitry to compare a time-varying voltage that corresponds to the time-varying current with the steady-state reference voltage, the second integrated circuit device further having a capacitive element to conduct at least part of the time-varying current received via the signal conductor out of the integrated circuit device via the reference voltage conductor.

27. An integrated circuit device comprising:
a signal input node and a reference voltage input node;
means for receiving a first signal having a time-varying current via the signal input node;
means for receiving a reference voltage via the reference voltage input node;
means for comparing a time-varying voltage that corresponds to the time-varying current with the reference voltage to recover digital information indicated by the time-varying current; and
means for conducting at least part of the time-varying current out of the integrated circuit device via the reference voltage input node.

28. An integrated circuit device comprising:
a signal output node and a reference voltage input node;
means for receiving a reference voltage via the reference voltage input node;
means for outputting a first signal having a time-varying current via the signal output node; and
means for receiving a time-varying return current that corresponds to the time-varying current of the first signal via the reference voltage input node.

* * * * *